United States Patent [19]

Merkin

[11] Patent Number: 5,696,968
[45] Date of Patent: Dec. 9, 1997

[54] METHOD AND APPARATUS FOR EFFECTING DRIVE ORDERING VIA ADAPTER PREFERENCE

[75] Inventor: Cynthia M. Merkin, Georgetown, Tex.

[73] Assignee: Dell U.S.A., L.P., Austin, Tex.

[21] Appl. No.: 531,671

[22] Filed: Sep. 21, 1995

[51] Int. Cl.$^6$ ............................................. G06F 9/06
[52] U.S. Cl. .................................................. 395/652
[58] Field of Search .............................. 395/651, 652, 395/653, 712, 681

[56] References Cited

U.S. PATENT DOCUMENTS

| | | | |
|---|---|---|---|
| 5,325,532 | 6/1994 | Crosswy et al. | 395/652 |
| 5,379,430 | 1/1995 | Nguyen | 395/652 |
| 5,379,431 | 1/1995 | Lemon et al. | 395/652 |
| 5,491,804 | 2/1996 | Heath et al. | 395/652 |
| 5,586,324 | 12/1996 | Sato et al. | 395/652 |
| 5,603,055 | 2/1997 | Evoy et al. | 395/652 |
| 5,630,076 | 5/1997 | Saulpaugh et al. | 395/651 |

*Primary Examiner*—Kevin A. Kriess
*Attorney, Agent, or Firm*—Haynes and Boone, L.L.P.

[57] ABSTRACT

A method for enabling a user to designate device order and boot-device preference in a computer system in which the devices are controlled by mass storage controllers is disclosed. In a preferred embodiment, a customization program of the present invention gathers user preference order for any controllers present in a computer system, which information is stored in a nonvolatile storage element in the computer system. During bootup of the computer, the system's ROM BIOS retrieves the stored preference information and initializes the system's mass storage controllers in the user-specified order. This initialization ordering controls which set of drives is configured first, and therefore, which drive is given boot priority and the drive ordering as seen by the operating system.

16 Claims, 2 Drawing Sheets

METHOD AND APPARATUS FOR EFFECTING DRIVE ORDERING VIA ADAPTER PREFERENCE

TECHNICAL FIELD

The invention relates generally to computer system having one or more mass storage devices connected thereto via mass storage controllers and, more particularly, to a method for enabling a user to designate which of one or more bootable drives connected to the system via mass storage controllers will serve as the boot drive, as well as the drive ordering of such drives.

BACKGROUND OF THE INVENTION

Current computer systems, especially server systems, tend to have more than one bootable device, such as a hard disks, magnetic tapes and, in some cases, CD-ROMs, installed in the system. The drive containing such a bootable device is, for obvious reasons, commonly referred to as the "boot drive." The system's access to the bootable devices is controlled by one or more mass storage controllers, for example, small computer systems interface ("SCSI") controller, typically implemented as adapter cards inserted in expansion slots of the computer. More and more, these intelligent controllers contain BIOS extensions for controlling the configuration and boot-preference order of the drives attached thereto.

As a result of the use of such mass storage controllers, the computer's ROM BIOS code doesn't control the actual disk drives and therefore does not the order of the drives or which drive functions as the boot drive. Accordingly, due to the computer's drive boot architecture, only the first bootable drive configured for the computer that is accessed during power up is actually the boot drive.

Therefore, what is needed is a means for enabling a user to specify the drive order, as well as which drive is to function as the boot-drive, in a computer system in which such drives are controlled by mass storage controllers.

SUMMARY OF THE INVENTION

The present invention, accordingly, provides a method for enabling a user to designate drive order and boot-drive preference in a computer system in which the drives are controlled by mass storage controllers that overcomes or reduces disadvantages and limitations associated with prior methods and systems. In a departure from the art, a customization program of the present invention gathers user preference order for any controllers present in a computer system, which information is stored in a nonvolatile storage element in the computer system. During bootup of the computer, the system's ROM BIOS retrieves the stored preference information and initializes the system's mass storage controllers in the user-specified order. This initialization ordering controls which set of drives is configured first, and therefore, which drive is given boot priority and the drive ordering as seen by the operating system.

In a preferred embodiment, the customization program presents the user with a system-defined number of selections of adapter, and hence, mass storage controller, preference order. Within each selection, the user can choose an on board I/O controller, if one is present, one of the allowable slots to select one of the mass storage controllers, or "none" to disable the selection. The program then stores the user's selection in the nonvolatile storage element within the system.

The next time the system boots up, the system's ROM BIOS code interrogates the nonvolatile storage element to determine whether the user has specified a preference order. If so, the ROM BIOS initializes the extension BIOS of the mass storage controllers in the user-specified order. Since it is the controller's extension BIOS that determines the drives that are attached to the controller and the first found bootable device is designated as the system boot-device, any devices attached to the first-preference controller are higher in boot-priority than devices attached to the next highest preference controller. Each controller is responsible for assigning the device level priority that the user has previously chosen.

A technical advantage achieved with the invention is that it enables a user to modify the apparent configuration of the system without recalling any devices.

A further technical advantage achieved with the invention is that it provides the user with a method for controlling device ordering as seen by the computer system.

Yet another technical advantage achieved with the invention is that it provides the user with a method to control the system boot and device ordering without opening the system covers.

DESCRIPTION OF THE PREFERRED EMBODIMENTS

Figure 1:
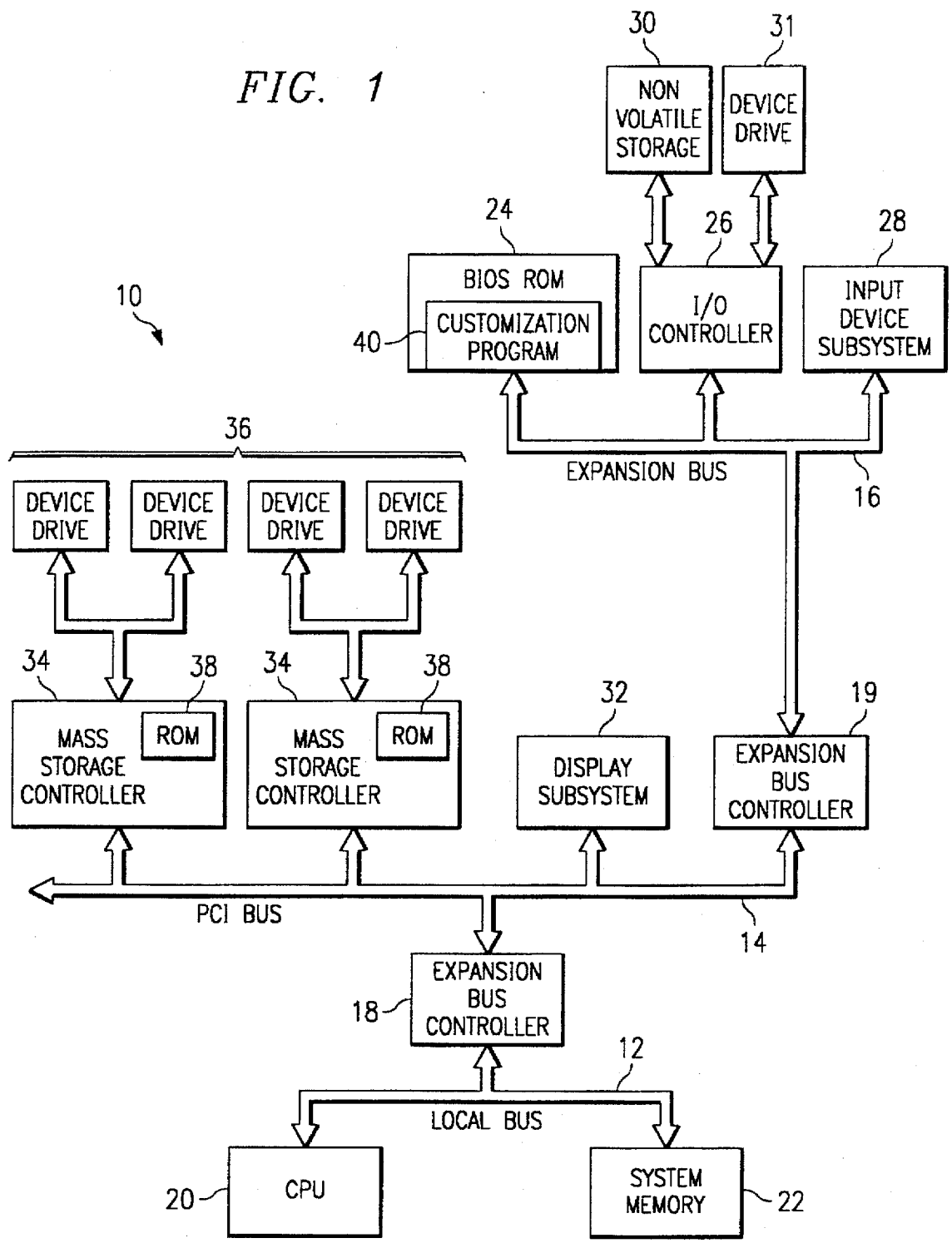
FIG. 1 is a schematic block diagram of a computer system embodying features of the present invention.

FIG. 1 is a schematic block diagram of a computer system 10 embodying features of the present invention. As shown in FIG. 1, the system 10 comprises a local bus 12, a PCI bus 14, and an expansion bus 16 electrically interconnected in a conventional manner via expansion bus controllers 18, 19. A central processing unit ("CPU") 20 and system memory 22 are connected to the local bus 12 in a conventional manner. Similarly, a basic input/output system ("BIOS") ROM 24, which contains the BIOS code for the system 10, an on-board I/O controller 26 and an input device subsystem 28 are connected to the expansion bus 16 in a conventional manner. Although not shown, it should be understood that the input device subsystem 28 comprises one or more of a keyboard, mouse and other input devices and appropriate device controllers. A nonvolatile storage element 30, such as NVRAM or CMOS, is connected to the expansion bus 16 via the I/O controller 26. In addition, one or more device drives 31, e.g., a hard drive or floppy drive, is also connected to the expansion bus 16 via the controller 26. Finally, a display subsystem 32, comprising, for example, video memory, a graphics controller and a display, is connected to the PCI bus 14. Also connected to the PCI bus 14 are one or more individually addressable mass storage controllers 34 each for controlling the operation of one or more device drives 36 connected thereto. Each of the device drives 36 may comprise, for example, a tape drive, a disk drive, a CD ROM drive or any other type of appropriate I/O device drive. In a preferred embodiment, the mass storage controllers 34 are implemented as adapter cards inserted in expansion slots (not shown) of the system 10. In accordance with a feature of the present invention, each mass storage controller 34, includes an option ROM 38 containing BIOS extension code for configuring the drives 36 attached thereto in a user-specified order in a known manner.

In normal operation of the system 10, when the CPU 20 executes the BIOS code stored in the ROM 24 during system power-up, one of the operations it performs is to look for any BIOS extensions, such as those stored in option ROMs 38, to be accessed and executed. As is known to those skilled in the art, it is a function of the architecture of the system 10 that the first-called BIOS extension that is installed on a mass storage controller that has connected thereto a bootable device owns the boot drive. Accordingly, by enabling the user to control the order in which the option ROMs 38 of the controllers 34 are accessed, the user is able to control the order of the drives 36, as viewed by the operating system, as well as which drive 36 will operate as the boot-drive.

In the preferred embodiment, a customization program 40 is provided in the BIOS ROM 24 for presenting the user, during a system setup routine, with a system-defined number of selections of adapter, and hence, mass storage controller 34, preference order. Within each selection, the user can select the on-board I/O controller 26, if one is present, one of the allowable slots to select one of the mass storage controllers 34, or "none" to disable the selection. The program 40 then stores the user's selection in the nonvolatile storage element 30.

Upon subsequent bootup of the system 10, the BIOS code retrieves the stored preference information from the storage element 30 and accesses the BIOS extensions 38 and initializes the mass storage controllers 34 in the user-specified order. This initialization ordering controls which set of drives 36 is configured first, and therefore, which drive is given boot priority and the drive ordering as seen by the operating system.

Figure 2:
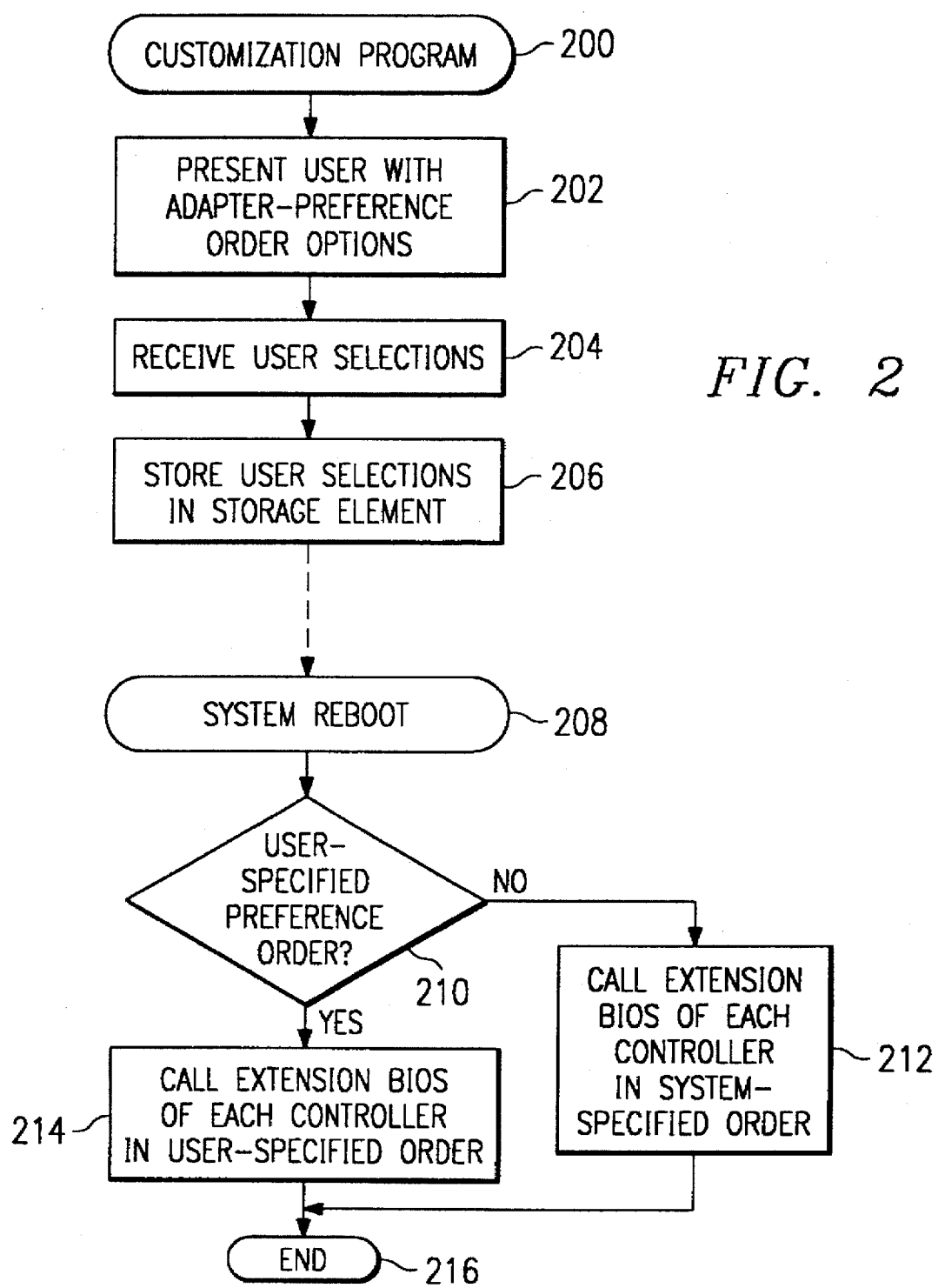
FIG. 2 is a flowchart illustrating the preferred method of operation of the present invention.

FIG. 2 illustrates the operation of the customization program 40 of the present invention. Execution begins in step 200. In step 202, the user is presented with adapter, and thereby controller 34, preference order options. In particular, the user is presented with a list of potential boot candidates from which the user can select. In step 204, the user preferences are received and then stored in the nonvolatile storage element in step 206.

In step 208, the system 10 is rebooted to activate the user-selected preference order. In step 210, a determination is made whether a user-specified preference order is present by interrogating the device 30. If not, execution proceeds to step 212, in which the system BIOS initializes the extension BIOS of each controller 34 in a system-specified order. If in step 210, it is determined that a user-specified preference order is present, execution proceeds to step 214, in which the extension BIOS of each controller 34 is called in the user-specified order. Once the extension BIOS 38 of each controller 34 has been initialized in step 212 or step 214, execution of the customization program terminates in step 216.

As a practical matter, the invention described herein may be particularly advantageous in server applications wherein two or more mass storage controllers 34 and their respective drives 36 contain redundant information for the following reason. If the drive 36 attached to the first-specified mass storage controller 34 is "bad," the extension BIOS 38 of the controller 34 thereof will not "see" the drive 36 as a bootable drive, hence, the system 10 will bootup from the drive 36 attached to the next-specified mass storage controller 34, assuming that drive is "good." In addition, the invention may be advantageously used where one or more operating systems are to be used interchangeably. In this situation, first and second operating systems, or first and second versions of the same operating system, may be respectively installed on drives 36 attached to first and second controllers 34. By using the customization program 40 of the present invention to designate an order in which the controllers 34 are called, the user can designate from which drive 36 the system 10 is to bootup and therefore which operating system is to be installed in the system 10. This designation can be easily changed by the user's rerunning the program 40 and changing the designation.

It is understood that the present invention can take many forms and embodiments, the embodiments shown herein are intended to illustrate rather than limit, the invention, it being understood that variations may be made without departing from the spirit of the scope of the invention. For example, any number of mass storage devices 34, each having any number of device drives 36 connected thereto, may be connected to the bus 14, limited, of course, by the number of available expansion slots. In addition, the computer system 10 could include one or more onboard PCI storage controllers connected to the bus 14. Moreover, a single adapter card connected to an expansion slot could have more than one mass storage controller contained thereon.

Although illustrative embodiments of the invention have been shown and described, a wide range of modification, change and substitution is intended in the foregoing disclosure and in some instances some features of the present invention may be employed without a corresponding use of the other features. Accordingly, it is appropriate that the appended claims be construed broadly and in a manner consistent with the scope of the invention.

What is claimed is:

1. In a computer system comprising a plurality of controllers each for controlling the operation of one or more device drives connected thereto, each of said controllers including an extension basic input output system ("BIOS"), a method for enabling a user to control which of said device drives will serve as a boot drive for said computer system and a device ordering of said device drives, the method comprising:

prompting a user to specify a preference order of said controllers;

storing said user-specified preference order in a storage element of said computer system;

retrieving said user-specified preference order from said storage element responsive to subsequent bootup of said computer system; and initializing said extension BIOS of each of said controllers in said user-specified preference order.

2. The method of claim 1 further comprising prior to said retrieving:

responsive to subsequent bootup of said computer system, determining whether said user-specified preference order is available; and responsive to a determination that said user-specified preference order is not available, initializing said extension BIOS of each of said controllers in a system-designated order.

3. The method of claim 1 wherein each of said device drives comprise one of a CD-ROM drive, a disk drive or a tape drive.

4. The computer program of claim 1 wherein a bootable device drive connected to a first-designated one of said controllers functions as said boot drive.

5. The computer program of claim 1 wherein said instructions for requesting and storing are executed during a setup routine of said computer system.

6. The method of claim 1 wherein said initializing is performed by a BIOS of said computer system.

7. A computer program for use in a computer system comprising a plurality of controllers each for controlling the operation of one or more device drives connected thereto, each of said controllers including a basic input output system ("BIOS") extension, the computer program for enabling a user to control which of said device drives will serve as a boot drive for said computer system and a device ordering of said device drives, the computer program comprising:

instructions for requesting a user to specify a preference order of said controllers;

instructions for storing said user-specified preference order in a storage element of said computer system;

instructions for retrieving said user-specified preference order from said storage element responsive to subsequent bootup of said computer system; and instructions for initializing said extension BIOS of each of said controllers in said user-specified preference order.

8. The computer program of claim 7 further comprising:

instructions for determining whether said user-specified preference order is available prior to said retrieving and responsive to subsequent bootup of said computer system; and instructions for initializing said extension BIOS of each of said controllers in a system-designated order responsive to a determination that said user-specified preference order is not available.

9. The computer program of claim 7 wherein each of said device drives comprise one of a CD-ROM drive, a disk drive or a tape drive.

10. The computer program of claim 7 wherein a bootable device drive connected to a first-designated one of said controllers functions as said boot drive.

11. The computer program of claim 7 wherein said instructions for requesting and storing are executed during a setup routine of said computer system.

12. Apparatus for use in a computer system comprising a plurality of controllers each for controlling the operation of one or more device drives connected thereto, each of said controllers including a basic input output system ("BIOS") extension, the apparatus for enabling a user to control which of said device drives will serve as a boot drive for said computer system and a device ordering of said device drives, the apparatus comprising:

means for requesting a user to specify a preference order of said controllers;

means for storing said user-specified preference order in a storage element of said computer system;

means for retrieving said user-specified preference order from said storage element responsive to subsequent bootup of said computer system; and means for initializing said extension BIOS of each of said controllers in said user-specified preference order.

13. The apparatus of claim 12 further comprising:

means for determining whether said user-specified preference order is available prior to said retrieving and responsive to subsequent bootup of said computer system; and means for initializing said extension BIOS of each of said controllers in a system-designated order responsive to a determination that said user-specified preference order is not available.

14. The apparatus of claim 12 wherein each of said device drives comprise one of a CD-ROM drive, a disk drive or a tape drive.

15. The apparatus of claim 12 wherein a bootable device drive connected to a first-designated one of said controllers functions as said boot drive.

16. The apparatus of claim 12 wherein said means for requesting and storing are executed during a setup routine of said computer system.

* * * * *